May 23, 1961 R. E. CARLBERG ET AL 2,985,072
MISSILE LAUNCHING SYSTEM
Filed Oct. 7, 1953 16 Sheets-Sheet 5

INVENTORS
ROBERT E. CARLBERG
SIDNEY HERSH

BY
ATTORNEYS

May 23, 1961 R. E. CARLBERG ET AL 2,985,072
MISSILE LAUNCHING SYSTEM
Filed Oct. 7, 1953 16 Sheets-Sheet 13

INVENTORS
ROBERT E. CARLBERG
SIDNEY HERSH
BY
ATTORNEYS

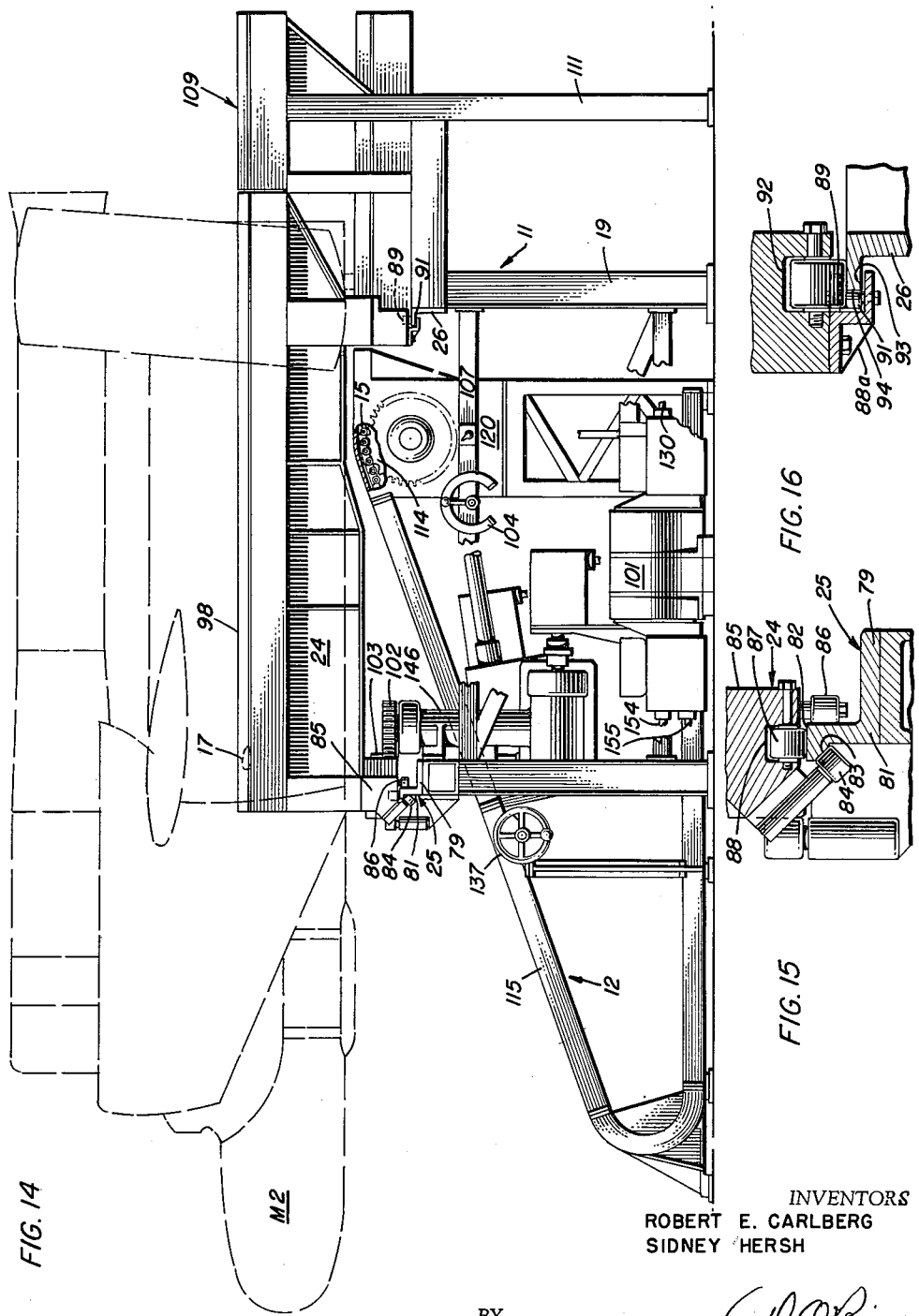

May 23, 1961 R. E. CARLBERG ET AL 2,985,072
MISSILE LAUNCHING SYSTEM
Filed Oct. 7, 1953 16 Sheets-Sheet 15

INVENTORS
ROBERT E. CARLBERG
SIDNEY HERSH
BY
ATTORNEYS

United States Patent Office 2,985,072
Patented May 23, 1961

2,985,072

MISSILE LAUNCHING SYSTEM

Robert E. Carlberg, Falls Church, Va., and Sidney Hersh, Silver Spring, Md., assignors to the United States of America as represented by the Secretary of the Navy Filed Oct. 7, 1953, Ser. No. 384,801

14 Claims. (Cl. 89—1.7)

(Granted under Title 35, U.S. Code (1952), sec. 266)

The invention described herein may be manufactured and used by or for the Government of the United States of America for governmental purposes without the payment of any royalties thereon or therefor.

The present invention relates to missile launching systems and more particularly to that type which is adapted for and designed to be used on shipboard and provided with a three-axis stabilized launcher. However, it is to be understood that the invention may be practiced other than on shipboard such as at stationary launcher sites. The launching system of the present invention is particularly suitable for the launching of guided missiles, rocket and similar self-powered devices.

Heretofore, none of the missile launching systems have been entirely satisfactory for shipboard launching of a pulse jet, wing type guided missile. One of the reasons why the prior launching systems have not been entirely satisfactory for shipboard launching of the afore-mentioned type missile is that none of them have employed a launcher constructed for three axis stabilization.

With the foregoing in mind it is an object of this invention to provide a missile launching system particularly adapted for shipboard use in launching a guided missile of the foldable wing type and which may be powered by a pulse jet motor, if so desired.

Another object resides in the provision of a missile launching system having a launcher stabilized in train, elevation, and cross traverse; a loader; a rammer; and an assembly stand.

A further object is to provide a launching system which may be remotely controlled by conventional gun control or fire director means.

Still another object resides in the provision of a launching system for self-propelled missiles wherein the missile blast is directed away from the mount operating mechanisms.

Yet another object of the present invention resides in the provision of a missile launching system which may be conveniently loaded and reloaded by shipboard personnel within a protective structure while the ship is under fire.

A further object is the provision of a missile launching system which normally supports the missiles prior to loading at a convenient height for operating personnel to make preflight inspections, adjustments and repairs.

A still further object resides in the provision of a missile launching system wherein the assembly stand and loading mechanisms thereof are enclosed within the structure of the ship and, at the same time, are so positioned as to require no lifting of the missile during the loading operation.

A still further object of the present invention resides in the provision of a missile launching system wherein the launcher and loader are positioned in longitudinal engaging alignment with one another when it is desired to ram a missile from the loader to its loaded position on the launcher.

Yet another object resides in the provision of a new and novel ramming mechanism for accomplishing the aforementioned transfer of the missile from the loader to the loaded position on the launcher.

Other objects and many of the attendant advantages of this invention will be readily appreciated as the same becomes better understood by reference to the following detailed description when considered in connection with the accompanying drawings wherein:

Fig. 1 is a side perspective view of the missile launching system in accordance with the present invention, a portion of the ship's superstructure enclosing the assembly stand, loading mechanism, and rammer mechanism being broken away to better disclose the relative locations of the several portions of the system and the missiles being disclosed by broken lines in supported position upon the various mechanisms within the enclosure;

Fig. 2 is a front perspective view of the launcher in an elevated and partially rotated position with a missile on the launching rails and a three-quarter perspective view of the remainder of the system with a second missile positioned on the loading mechanism in a ready position to be rammed onto the launcher after the missile on the launching rails has been fired and the launcher has returned to the position indicated in Fig. 1;

Fig. 14 is a side elevation of the loading and ramming mechanisms with the shuttle car buffer stop removed and certain portions of the supporting structure broken away to better disclose the mechanisms of the loader and rammer;

Fig. 15 is an enlarged end view of one of the shuttle car supporting rails and the shuttle car rollers which cooperate therewith;

Fig. 16 is an enlarged end view of the other shuttle car supporting rail;

Figure 1:
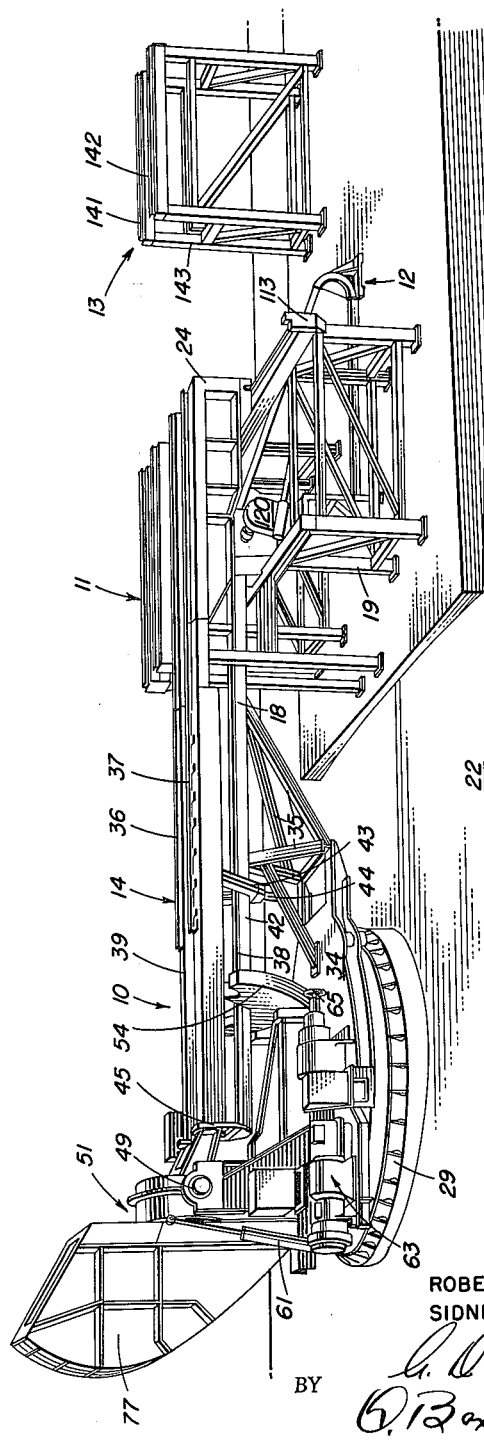

Referring now to the several figures of the drawings and more particularly to Figs. 1, 2, 4 and 5 wherein the various components and mechanisms of the missile launching system are illustrated in a manner to indicate the cooperating relationship therebetween it will be observed that the system includes a three-axis stabilized launcher 10, a loading mechanism 11, a ramming mechanism 12, and an assembly stand 13, each of which will now be described generally in order to facilitate a clear understanding of the detailed description thereof appearing hereinafter.

The launcher 10 is a power driven remotely controlled mount having the launching rails 14 stabilized so as to maintain a fixed attitude with respect to the horizon in elevation and cross traverse as will become more fully apparent as the description proceeds. The launcher 10 is "muzzle loaded" by the power driven, manually controlled, horizontal ramming mechanism 12. The ramming mechanism 12 includes a unidirectional chain 15 with a ramming head assembly 16 connected thereto for engagement with the lower rear launching shoe 17 of each missile to be transferred from the loader to the launcher or vice versa. A spanner rail 18 for spanning the distance between the loading mechanism 11 and the launcher 10 is secured to the trainable portion of the launcher.

Figure 5:
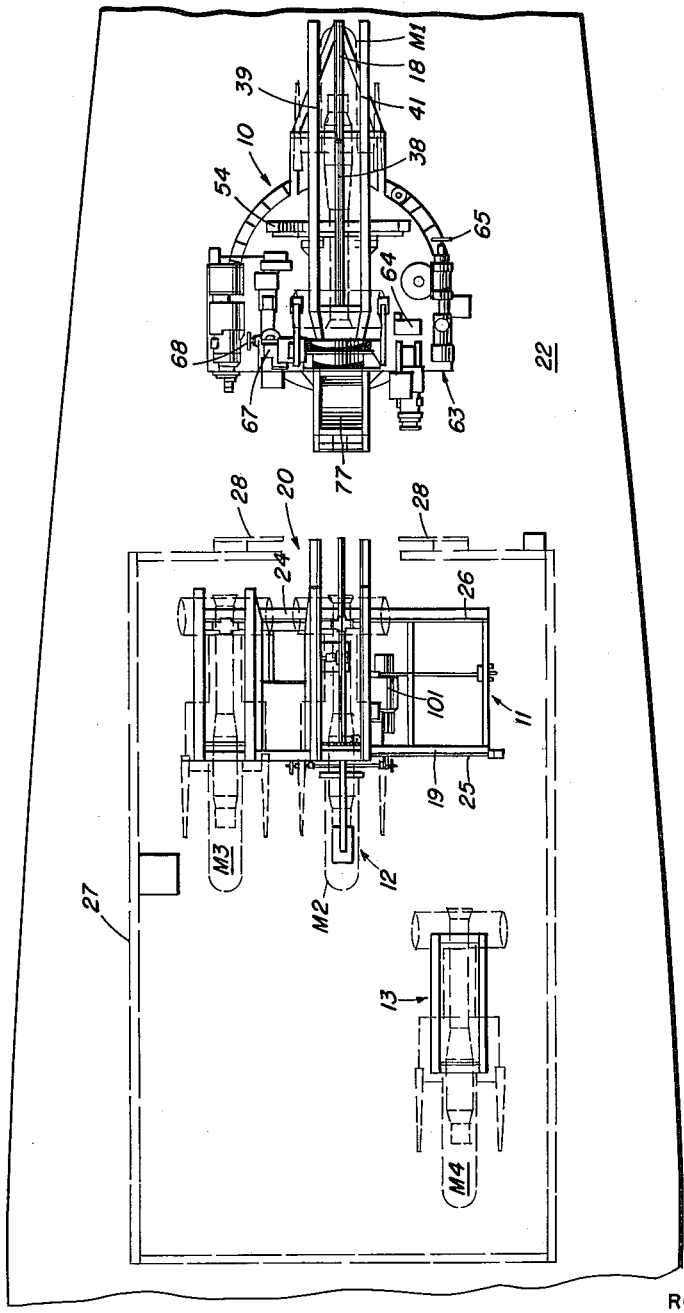
Fig. 5 is a top plan view of the missile launching system mounted upon the deck of a vessel.
Figure 6:
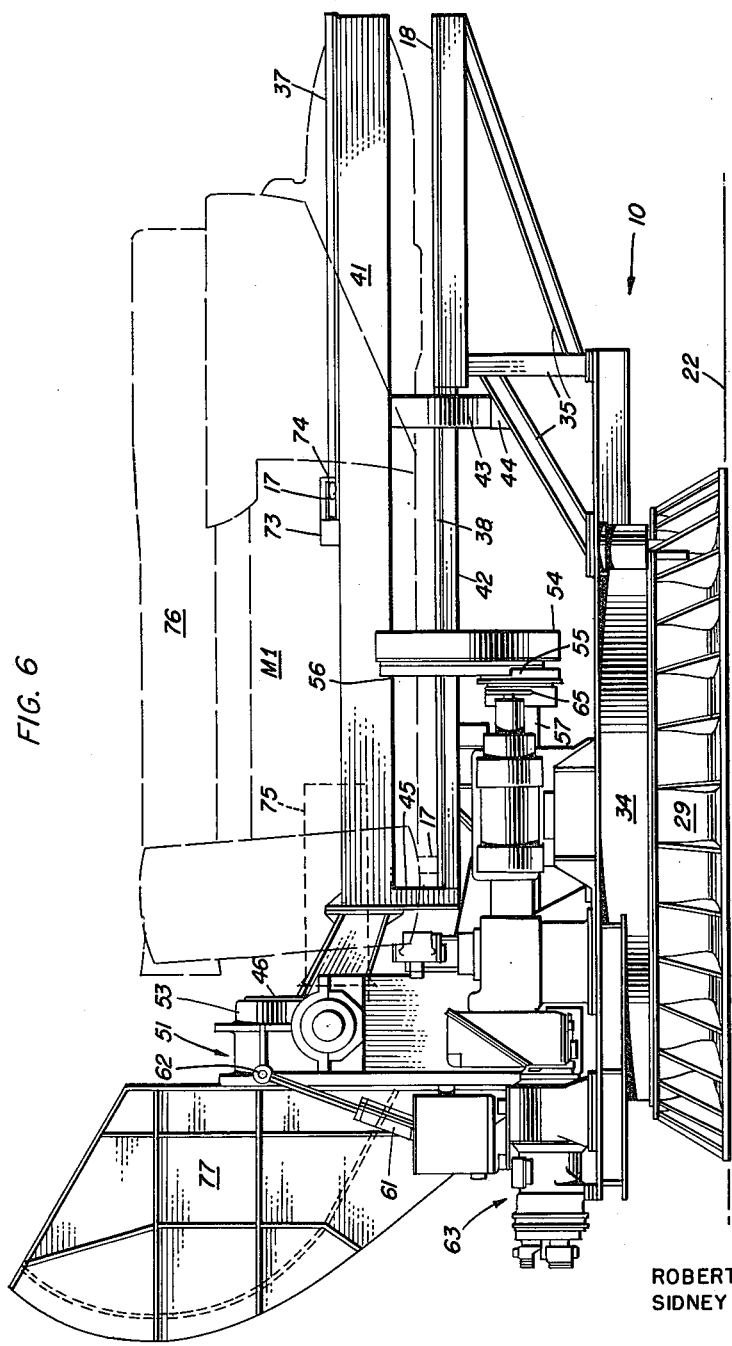
Fig. 6 is a side elevation view of the launcher.

The loading mechanism 11 includes a rigid structure 19, fixedly secured to a suitable foundation 21 provided upon deck 22 of a ship 23. The loading mechanism 11 further includes a shuttle car 24 which is power driven by apparatus to be later described and which is adapted to carry a plurality of missiles M2 and M3, two being shown in the drawings for purposes of description. One of the two missiles which are carried by shuttle car 24 will always be aligned with the launcher loading position, as best illustrated in Fig. 5. The shuttle car 24 is mounted upon suitable transverse guide rails 25 and 26 so as to permit oscillation of shuttle car 24 athwartship.

The assembly stand 13 is rigidly secured to foundation 21, to provide a structure upon which the missile components may be assembled after being removed from the shipping crates. After assembly of the missile on assembly stand 13, the missile is checked out for satisfactory operation and moved by any suitable means such, for example, as by overhead trolley (not shown) onto shuttle car 24 on the loading mechanism.

All components and mechanisms of the missile launching system with the exception of the launcher are enclosed within a suitable housing 27 having sliding doors 28 which, when open, provide an opening 20 or travel space for a missile at the launching position to move from the loading mechanism 11 onto the spanner rail 18 and the launcher 10 at the appropriate time. Sliding doors 28 are normally closed except during transfer of a missile from the loading mechanism to the launcher.

It will be apparent that in the event the missile launching system is mounted on the forward portion of a ship, the loading mechanism, the ramming mechanism, and the assembly stand will all be secured to the deck of the vessel aft of the launcher. On the other hand, in the event the system is mounted on the aft portion of the vessel, the afore-mentioned components other than the launcher will be secured to the deck of the vessel forward of the launcher. Obviously any other suitable arrangement of the various components of the system may be employed if so desired.

The various components and mechanisms included within the system will now be individually described in detail.

*Launcher*

The launching mechanism 10, as shown in detail in Figs. 6 through 9 is rotatably mounted to the deck 22 by means of a conventional stand 29, including hold down clips 30, thrust rollers 31, radial roller path 32, training circle 33, and base ring 34. The spanner rail 18 is secured to the base ring 34 by a suitable framework structure 35 and arranged to receive the lower missile launching shoe 17 of a missile M1 shown in broken lines in Figs. 6, 8 and 9 when the launcher is the loading position, as is best illustrated in Fig. 1.

Figure 8:
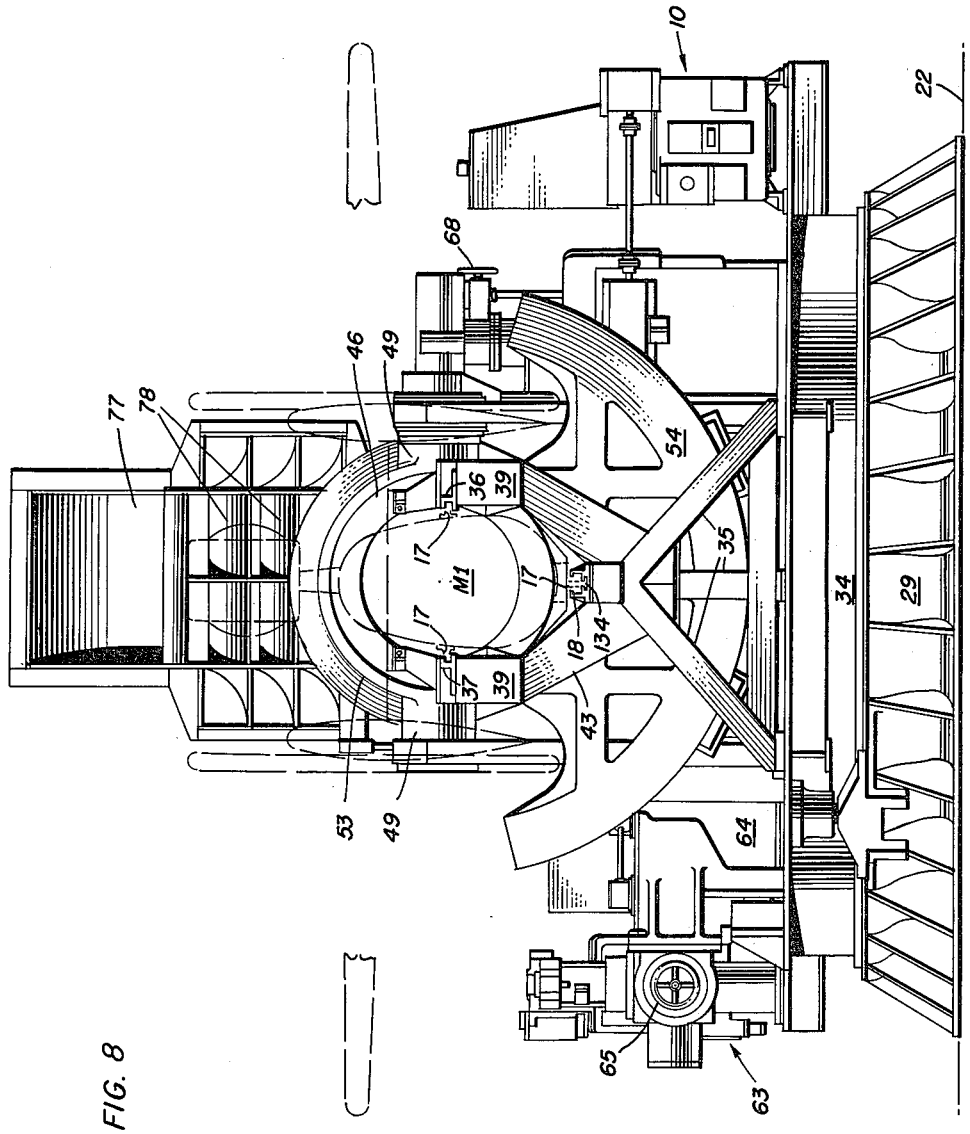
Fig. 8 is a front elevation view of the launcher mechanism.
Figure 9:
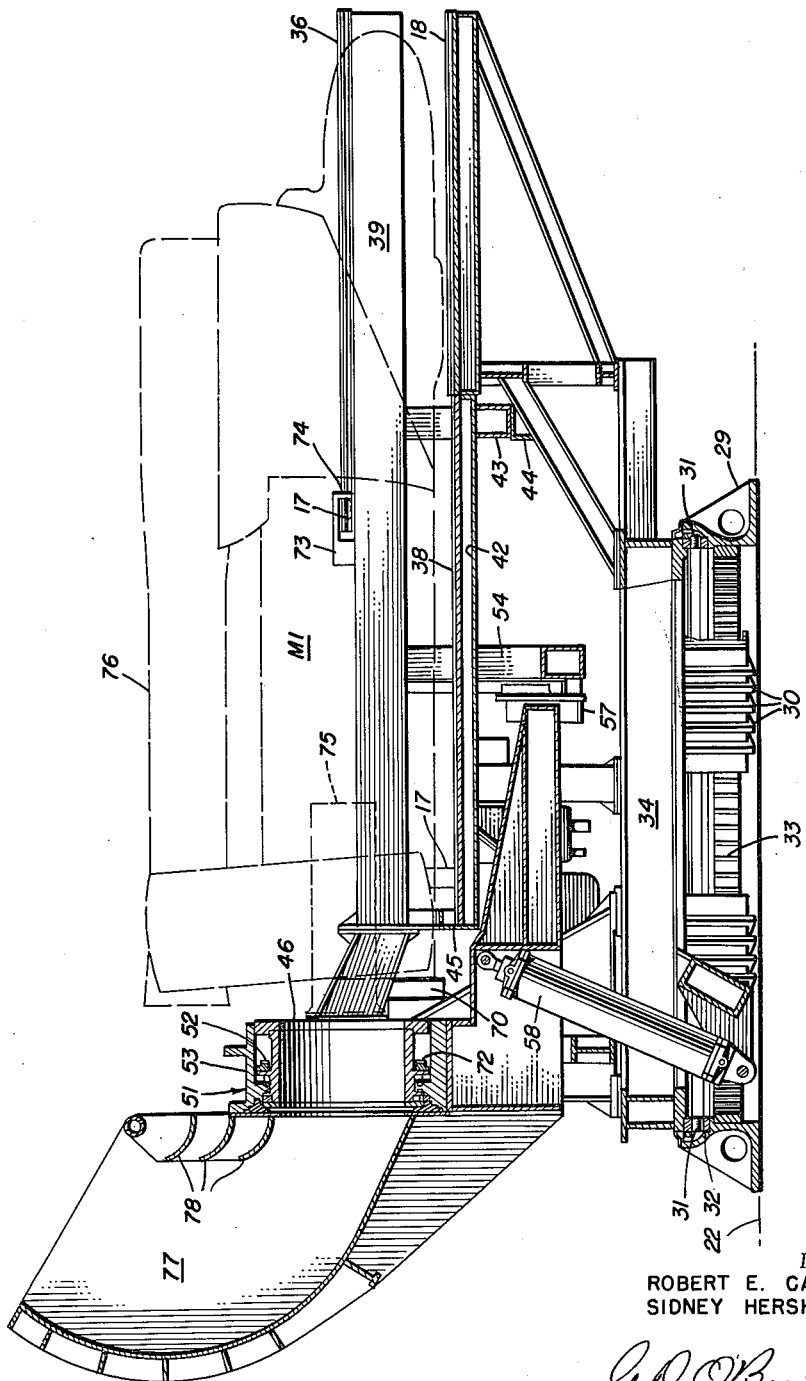
Fig. 9 is a longitudinal, vertical section view of the launcher as viewed from a line substantially corresponding to section line 9—9 in Fig. 7.
Figure 10:
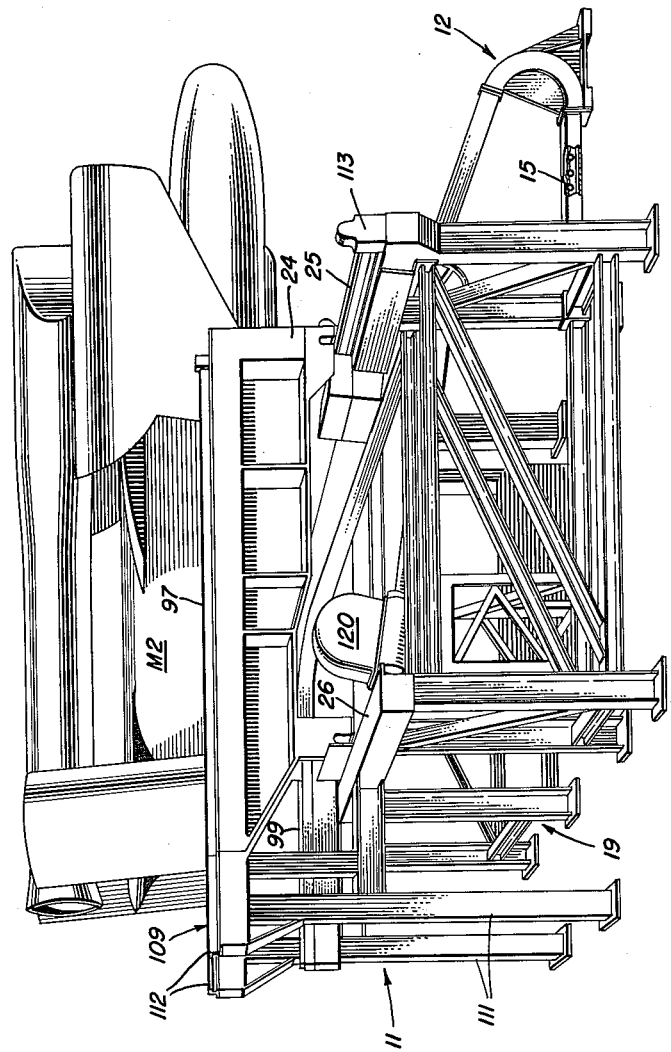
Fig. 10 is a side perspective of the loading and ramming mechanisms with a missile secured thereto for ramming.
Figure 11:
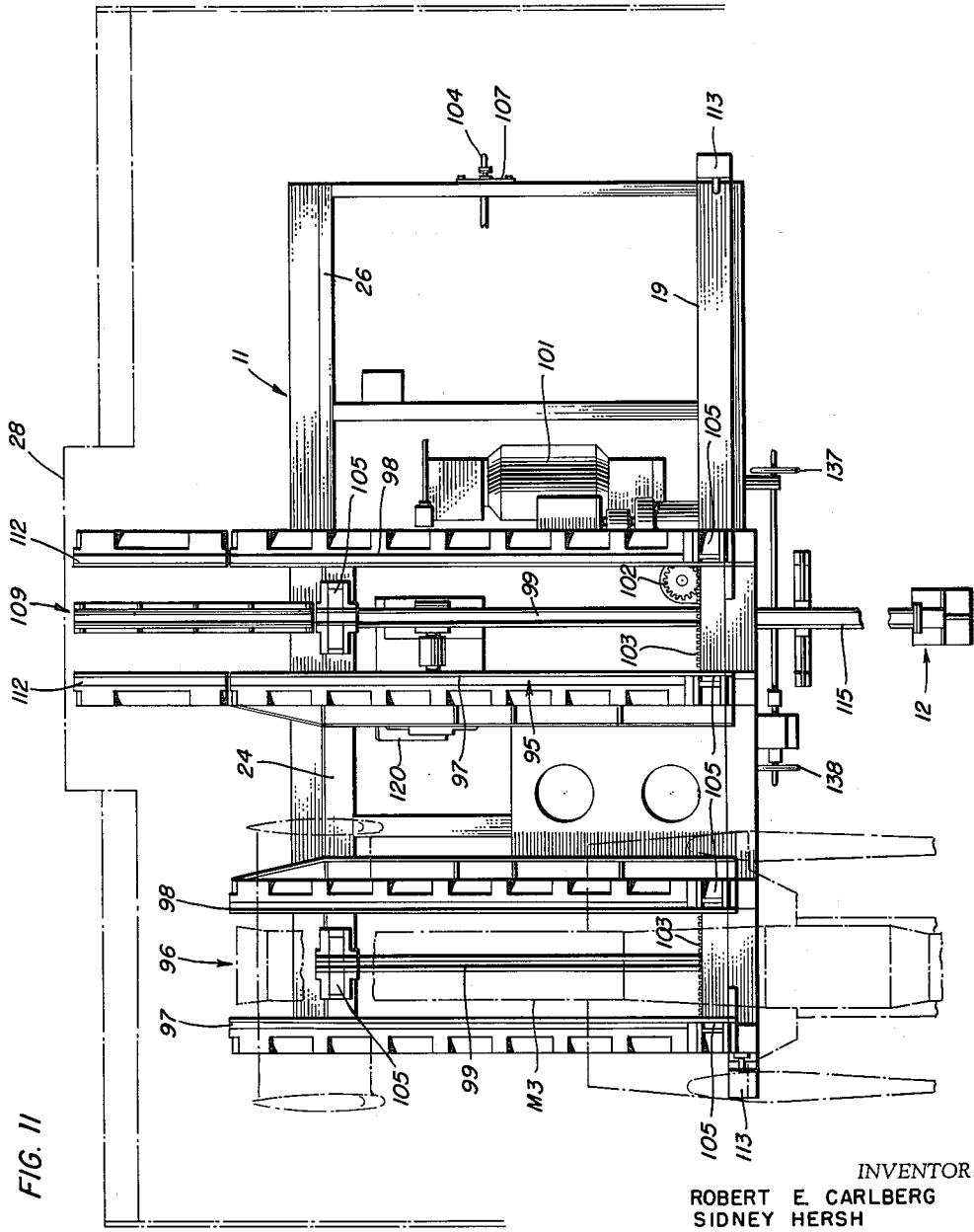
Fig. 11 is a top plan view of the loader and a portion of the rammer, one missile being illustrated in phantom in the ready-service position on the loader.
Figure 12:
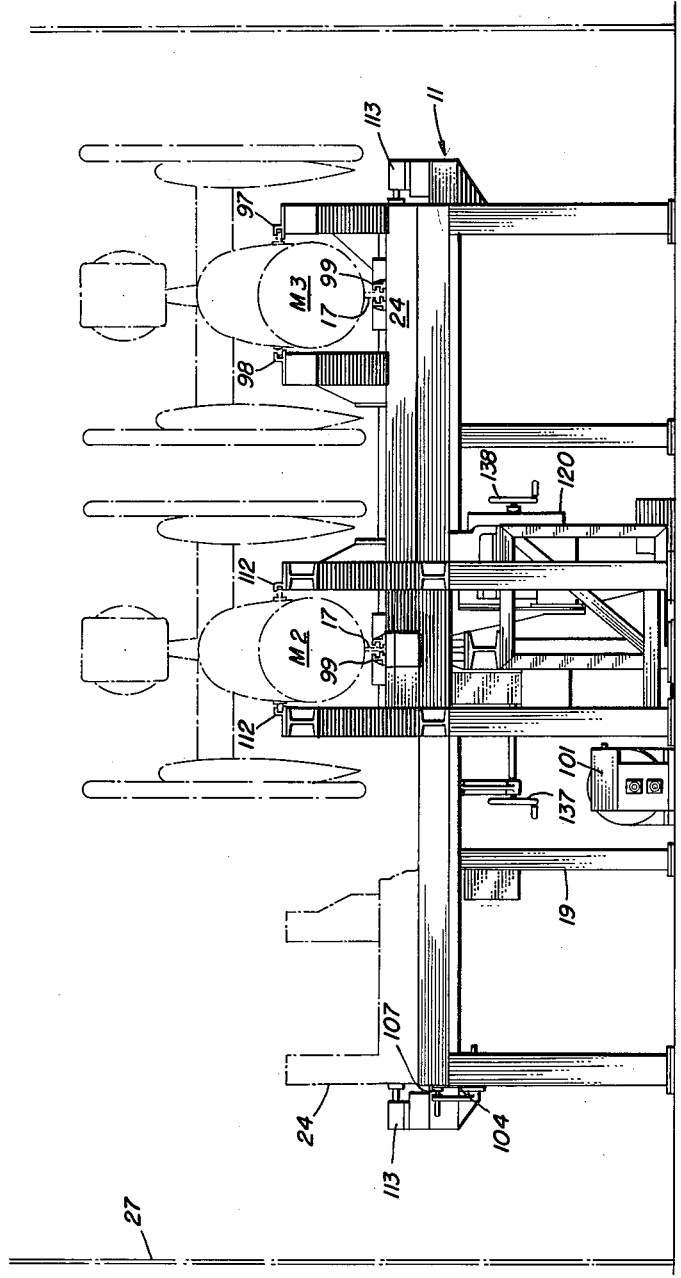
Fig. 12 is a front elevation view of the loader with two missiles positioned thereon.
Figure 13:
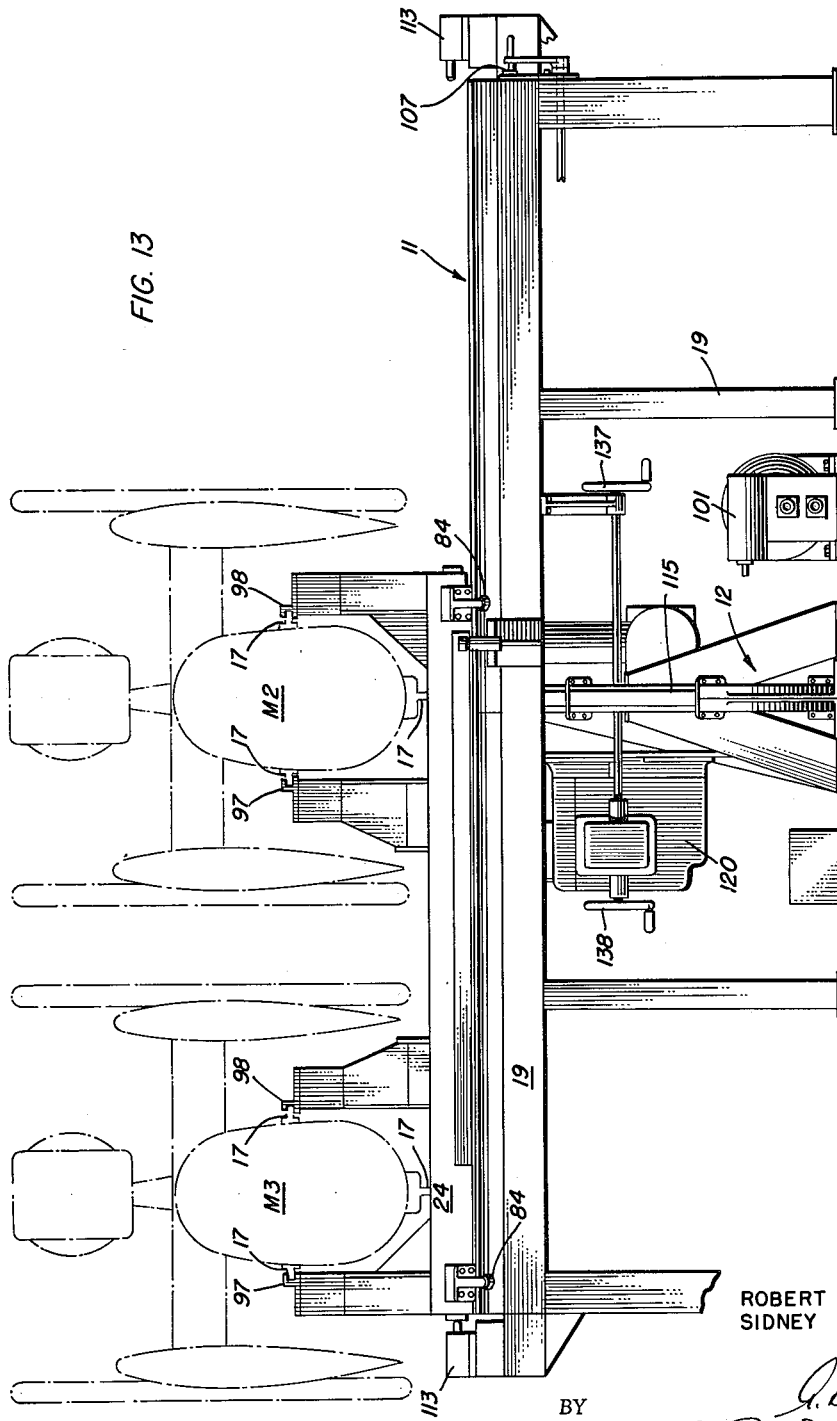
Fig. 13 is a rear elevation view of the loading and ramming mechanisms of the launching system.

The launching rails 14 include a pair of transversely spaced upper rails 36 and 37, best viewed in Figs. 7 and 8, and a third rail 38 which is carried below, between, and, for the most part, rearwardly of rails 36 and 37, as viewed in Figs. 7 and 9. Rails 36 and 37 are rigidly mounted upon rail supporting beams 39 and 41, respectively, in such a manner as to slidably receive the upper missile launching shoe 17 of missile M1. The lower launching rail 38 is rigidly mounted upon a similar but shorter supporting beam 42. Rail supporting beams 39, 41 and 42 are connected to one another and carried by a yoke type frame 43 for the purpose of not only providing a rigid assembly of launching rails but also to provide means for attaining the proper alignment between the spanner rail 18 and lower launching rail 38. The latter function is accomplished when the undersurface of yoke 43 engages stop 44 which, if desired, may be carried by the spanner rail supporting structure 35.

The after portions of the launching rails are secured to one another by yoke structure 45 which is generally similar to yoke 43 previously mentioned. The launching rail assembly 14 is carried as a unit at the left end thereof, as viewed in Figs. 6 through 9, by a longitudinal, rotatably mounted trunnion 46 located aft of the loaded missile M1.

One of the launching requirements of a wing type missile is that the wings thereof should be maintained in a horizontal position relative to the horizon at the instant of launching, and the structure for oscillating the launching rails about the longitudinal axis of a missile carried thereby materially assists in fulfilling such a requirement, as will more fully appear as the description proceeds.

Figure 7:
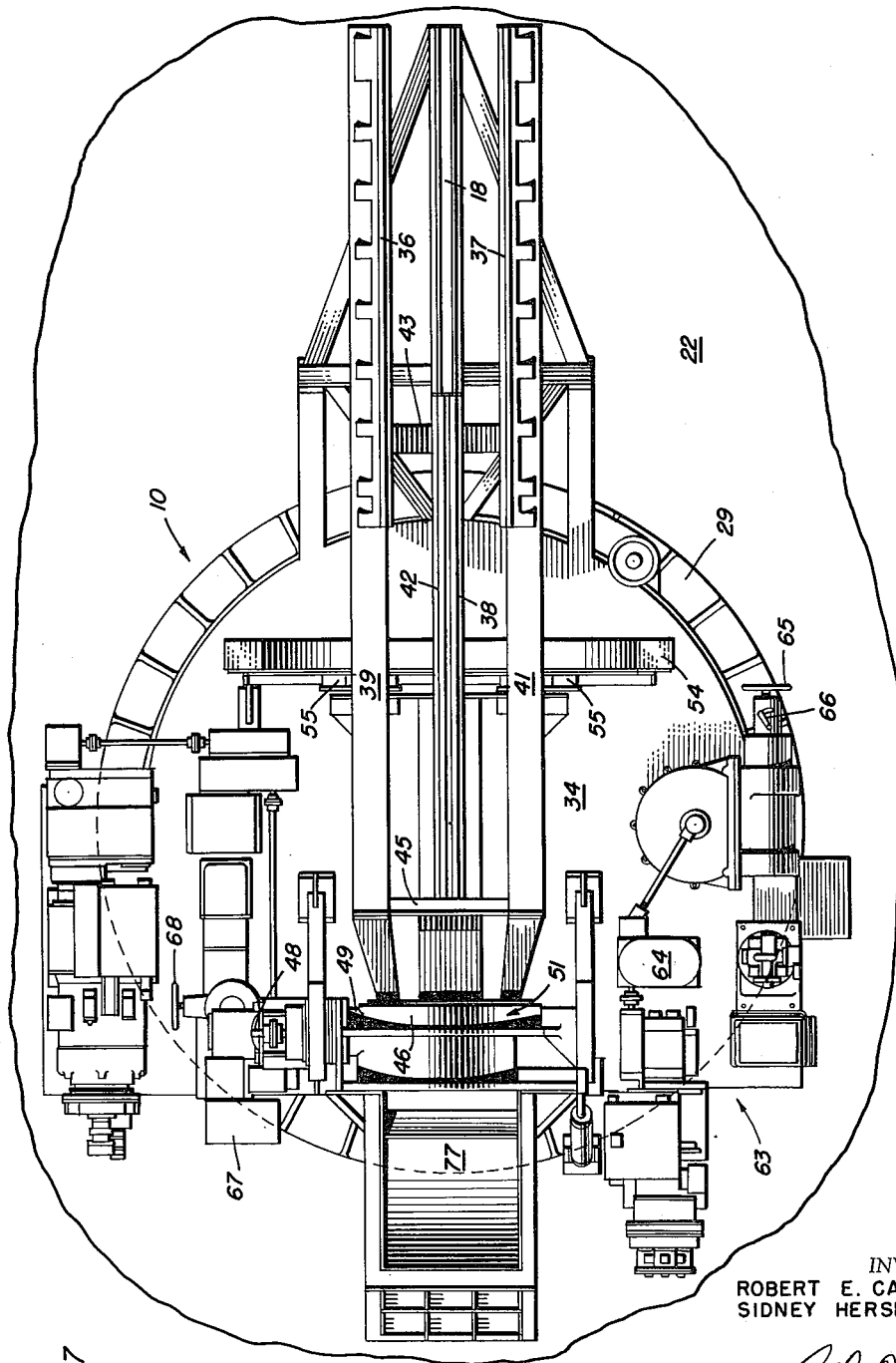
Fig. 7 is a top plan view of the launcher.

The mechanism for providing oscillatory movement, alternatively referred to as a cross-traverse movement, of the launching rails about the longitudinal axis of a missile carried thereon includes a worm gear, not shown, driven by shaft 48 which is rotatably mounted upon the axis of rotation of one of the elevation trunnions 49 and driven by motor 50 as viewed in Fig. 7. Motor 50 and suitable power transmitting means are carried by the trainable base ring 34 of the launcher. Trunnion 46 of the cross-traverse or oscillating mechanism is carried on the elevating structure, generally indicated by numeral 51, of the launcher and thereby provides for an oscillatory motion of the launcher rail about the longitudinal axis of the missile carried thereby regardless of the elevation setting of the launcher.

The afore-mentioned worm gear drive meshes with worm wheels 52 which are drivingly connected within trunnion housing 53 to trunnion 46 which, in turn, is rigidly connected to the launching rails upon which the missile M1 is carried.

A cradle support 54 is located intermediate yokes 43 and 45 and is provided for supporting the forward end of the launcher in any attitude desired. Cradle support 54, is rigidly connected to each launching rail and serves to mount the launching rails as a unit to the base ring structure for oscillation about the longitudinal axis of a missile carried thereon such, for example, as missile M1. Support 54 is carried on rollers 55 within a suitable raceway 56. A frame 57 is secured to elevating structure 51 in any manner found convenient for the purpose, as by welding or bolting, for example.

As will be apparent, the elevating structure 51 supports the structure for effecting cross-traverse adjustments heretofore described. Elevation trunnions 49 are of the self-aligning rotatably mounted type and are located on the cross-traverse trunnion housing 53. These trunnions 49 are supported for rotation about an axis transverse to the launcher. A hydraulic elevating cylinder 58 which is pivotally secured to base ring 34 at the lower end thereof and having a suitable piston (not shown) and piston rod 59 pivotally connected at the upper end thereof to the elevating structure 51 of the launcher. The elevating cylinder 58 has cushioned end portions (not shown) to thereby provide positive stops in elevation. A compensating cylinder 61 is located aft of the elevation trunnions 49 and is connected to the elevating structure 51 by a pivot pin 62 on the trunnion housing 53. Compensating cylinder 61 has a displacement equal to the displacement of the piston and piston rods of elevating cylinder 58. By compensating for the difference between the effective areas of the two sides of the elevating cylinder 58, the compensating cylinder functions to equalize the flow of fluid insofar as volume is concerned within the hydraulic elevating system, not shown. It will be understood that any suitable means for effecting a compensation for the difference between the volumes of the two sides of the elevating cylinder may be employed, and that the use of a compensating cylinder for this purpose is merely illustrative of one means of effecting such a compensation. The effect accomplished by the employment of compensating cylinder 61 is identical to that which would be accomplished if a fluid were supplied to a double-ended cylinder.

A manually operated pump (not shown) is provided for manual elevation of the launcher for maintenance purposes.

The elevation limit stops, not shown, are so positioned and arranged as to allow for a maximum elevation setting of 65° and a minimum setting of 3° except when the launcher is placed in the loading position whereupon provision is made for a 0° elevation.

The power drive 63 for training the launcher includes major components of a conventional train power drive and forms no part of the present invention. However, for purposes of a more complete understanding of the present system, the train power drive therefor will be briefly described. The launcher may be trained through an angle of 720° with positive stops at either end of the training angle and through an angle of 230° when firing. The train angle will be regulated when the mount is connected to a conventional fire control director so that the missile flight path will not interfere with the superstructure of the ship in either train or elevation. In addition, a limit stop mechanism 64 is provided for establishing adjustable limits from 0° to 150° on either side of the normal forward firing position. These limits are effective only when the mount is loaded. The limit stops 64 permit rotation or training of the unloaded mount through 360° on either side of the central loading position. Handwheel 65 and a suitable manually operated clutch 66 are provided for manual training of the mount for maintenance purposes.

The power drive for effecting cross-traverse or oscillatory movement of the launcher, which includes motor 50, receives cross-traverse signals from the fire control system which may be of conventional type, if so desired, in the form of a differential which is a combination of responses from elevation and cross traverse and the output of which is true cross-traverse response. The true cross-traverse response is fed into the cross-traverse receiver regulator 67. Suitable limit stops (not shown) are provided in the power drive to restrict the angle of cross traverse to any extent found desirable. A manually operated handwheel 68 is provided for maintenance purposes.

As will be observed, sufficient clearness is allowed behind missile M1 for the connection of an electrical connector 70 in order that certain of the internal components of the missile M1 may be set in operation. Compressed air may be supplied to the missile through a remotely controlled connector 71. Another connection, not shown, for air is provided for starting the reso-jet motor.

A suitable holdback device 73 for the purpose of fixing the range of short flights will restrain the missile and prevent it from leaving the launcher while a predetermined part of the booster impulse is expended. This holdback device may be of any suitable construction desired and is carried by the cross-traverse structure. However, for the purpose of this description it may be stated that the holdback device 73 is mounted on the upper launching rails 36 and 37 and may include a time thrust integrating mechanism, forming no part of the present invention, to measure the energy release of the burning booster and to release a restraining latch 74 when the residual energy is of the correct amount for the range desired. A control for setting the desired amount of residual energy of the burning booster at the instant of release may be remotely positioned on an appropriate control panel, not shown, and is electrically connected to the holdback device 73 on the launcher in any manner found suitable for the purpose.

The backblast from booster 75 passes through the center of the cross-traverse trunnion 46 and the backblast of the reso-jet 76 passes over the top of trunnion housing 53. A blast deflector 77 is connected to trunnion housing 53 and is equipped with upwardly directed blast deflector vanes 78 for directing the blast from the jet units in an upwardly direction thereby eliminating danger to operating personnel and adjacent equipment.

At the instant of launching, missile M1 will be guided during the first few feet of launching travel by the launching rails 36, 37 and 38 each of which accommodates a different launching shoe 17 provided on the missile, as hereinbefore mentioned. Because of the disposition of the several launching rails and the missile launching shoes, all missile launching shoes leave the launching rails simultaneously thus eliminating any "tipoff" effect, similarly as in copending application Serial No. 252,970, filed October 24, 1951, by Ferdinand J. Schiavi, and entitled Missile Launcher.

*Loader*

The rigid supporting structure 19 upon which shuttle car 24 is carried may be of any suitable construction desired commensurate with strength and space requirements. As previously mentioned a pair of transverse shuttle car guide rails 25 and 26 are mounted upon the upper portion of supporting structure 19. The left rail 25, as best viewed in Figs. 14 and 15, is substantially Z-shaped and is provided with a horizontal base 79 by which it is secured to supporting structure 19. An upstanding wall portion 81 is integrally formed with the outboard edge of base 79, and a horizontal flange 82 extends in a direction opposite to that of base 79. The undersurface of flange 82 is chamfered as at 83 to provide an inclined rolling surface for roller 84. It will be observed that roller 84 is carried by undercarriage 85 of shuttle car 24 at an inclination corresponding to that of chamfered surface 83 and thereby prevents undesired separation of the shuttle car from the supporting structure. Vertically suspended rollers 86 are also carried by undercarriage 85 of the shuttle car and engage the inner surface of wall member 81 to thereby prevent transverse movement of the shuttle car relative to rails 25 and 26. A third group of rollers 87 is provided and constrained by suitable means, not shown, within recess 88 of undercarriage 85 to ride upon the upper surface of the horizontal flange 82 of rail 25 to thereby facilitate movement of the shuttle car therealong.

The other shuttle car supporting rail 26 is an inverted L-shaped channel member secured in any suitable fashion as by welding to the upper portion of supporting structure 19 and transversely spaced from rail 25 as viewed in Figs. 14 and 16. A depending bracket 88a is provided with horizontally and vertically disposed rollers 89 and 91, respectively. Rollers 89 and 91 are rotatably mounted within recesses 92 and 93, respectively. It will be observed from an inspection of Figs. 14 and 16 that roller 89 rides upon the upper surface of rail 26 and roller 91 rides upon edge 94 of rail 26 to thereby complete the connection between the shuttle car and the supporting structure therefor and thereby restrain movement of the shuttle car in all directions except in a direction transverse to the longitudinal axis of the launcher 10 when the latter is in loading position.

Figure 19:
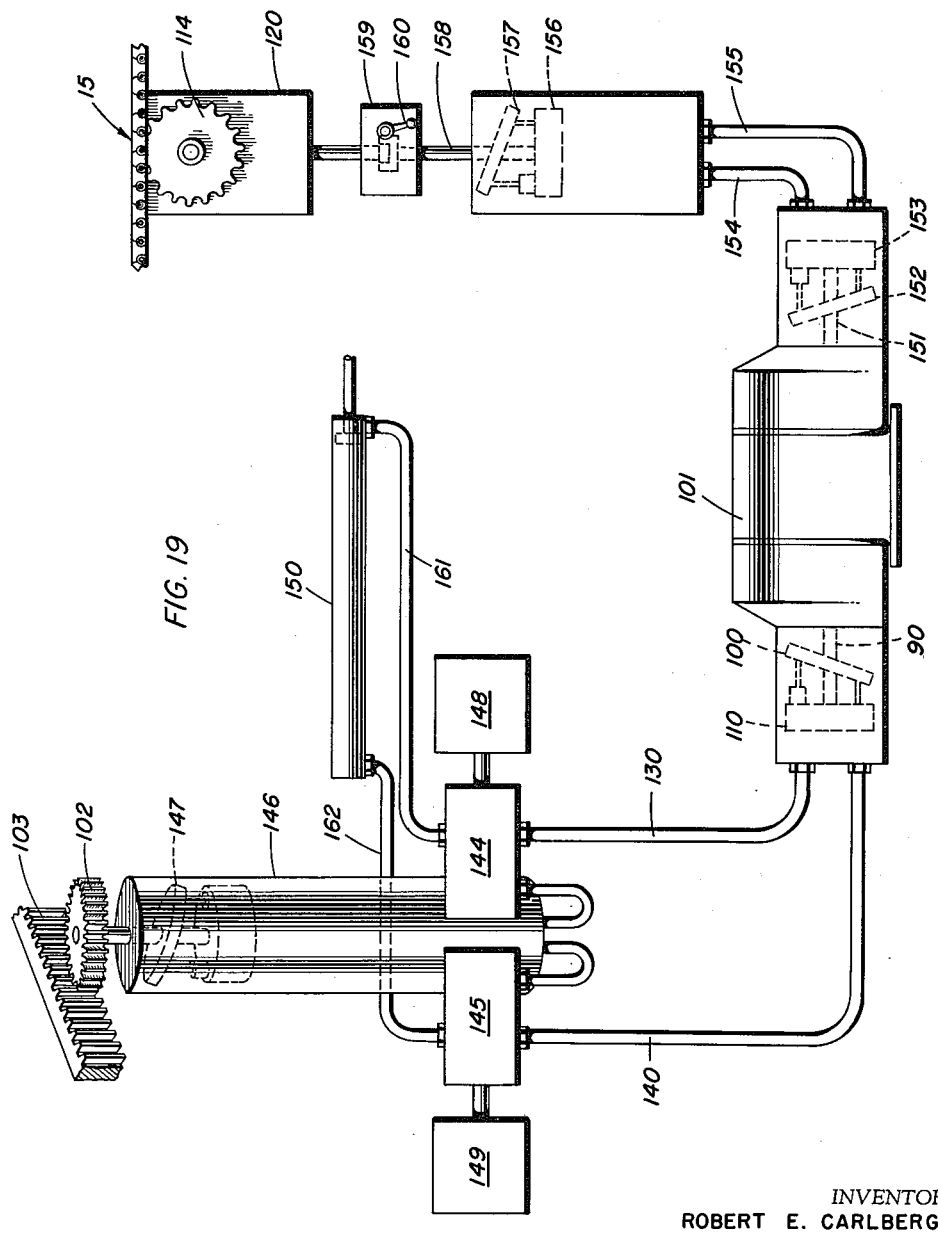
Fig. 19 is a schematic showing of the shuttle car and rammer chain actuating mechanisms.

The shuttle car 24 is a frame structure carrying two groups of missile supporting rails 95 and 96 having three rails 97, 98, and 99 in each set and arranged transversely to the direction of travel of the shuttle car. Rails 97, 98, and 99 are positioned and arranged in a manner substantially identical to that of rails 36, 37 and 38 of the launcher so that when the launcher is in loading position, Fig. 1, the three rails of one set of rails carried by shuttle car 24 will be in longitudinal alignment with the rails of the launcher. A missile such, for example, as missile M2 or M3 is carried by each of the two sets of rails on the shuttle car 24. The shuttle car is power operated by motor 101 suitably connected to pinion 102 which engages rack 103 carried by the shuttle car. Fig. 19 discloses in schematic form the manner in which motor 101 may serve as the power drive for the shuttle car, rammer, and door opening and closing operations. It will be noted that certain elements illustrated in Fig. 19 have been reversed as to location when considered in connection with the other figures. This has been done for ease of illustration and in no manner affects the operation of the system.

Shaft 90 of electric motor 101 serves to rotate wobble plate 100 and thereby produce a pumping action within pump 110 which is connected to a source of hydraulic fluid, not shown. Thus fluid is pumped through lines 130 and 140 via valves 144 and 145, respectively, to the hydraulic side of a wobble plate 147 within housing 146 to thereby convert hydraulic pressure into rotary motion in either direction depending upon which valve is first actuated by solenoids 148 and 149. Pinion 102 is mechanically connected to the wobble plate 147 and is rotated in response to the afore-mentioned hydraulic actuation of the wobble plate. Rack 103 being meshed with pinion 102, is moved linearly in response to rotation of pinion 102. Valves 144 and 145 are normally maintained in a closed position and may be selectively operated by any suitable control means, not shown, connected to solenoids 148 and 149. Manual control for regulating the movement of the shuttle car is provided by control lever 104. By actuation of control lever 104, shuttle car 24 may be caused to travel in an oscillating, athwartship motion to thereby orient either missile M2 or M3 with the rammer 12, to be described more fully hereinafter, and enable the latter to ram the aligned missile onto the launcher. Sliding rail sections 105 permit missiles to be lowered onto shuttle car 24 from above. The shuttle car 24 is automatically latched by a latching mechanism of any suitable design at each position in which a set of rails are in longitudinal alignment with the launcher rails when the launcher is in the loading position.

Sliding doors 28 are controlled by lever 104 which is also employed for controlling the motion of shuttle car 24 as afore-mentioned, a selector switch 107 adjacent the lever being used to select between shuttle car operation and door operation. Switch 107 is electrically connected to solenoids 148 and 149 in any manner found convenient for the purpose to thereby energize these solenoids and move valves 144 and 145 to such a position as to allow pressurized fluid to pass into and out of cylinder 150 through hydraulic lines 161 and 162, respectively. Thus, it will be apparent that doors 28 may be either opened or closed, as desired, by the proper actuation of solenoids 148 and 149 by selector switch 107.

A manual connect and automatic disconnect electrical plug 108 is provided for check out and warm up of electrical components within the missile. Thus it will be apparent that as shuttle car 24 is moved from a shuttled position to a loading position, the missile to be loaded is moved from a ready-service position to a ramming position.

In order to provide a continuous track upon which the missile will ride during the loading operation, a short track section, generally designated 109, is connected to the rigid supporting structure 19 and suitably reinforced for additional strength by any means found desirable for the purpose such, for example, as by a supporting column 111. Rails 112 of track section 109 are disposed in alignment with the afore-mentioned opening 20 and with the loading and launching rails 14 on the launcher.

Buffer stops 113 are positioned at each end of each of the rails 25 and 26 so that a positive stop is provided for the shuttle car at each limit of its movement.

Rammer

The rammer, generally indicated by reference numeral 12, includes a unidirectionally driven chain 15 having a rammer head assembly 16 provided thereon. Rammer chain 15 is guided through housing 115 and over sprocket 114 which is mechanically connected to a suitable gear reduction unit 120, the latter being hydraulically connected to power drive 101 in any suitable manner such, for example, as that shown in Fig. 19.

Shaft 151 of electric motor 101 is connected to wobble plate 152 to rotate the latter in response to operation of the motor. A pumping action is thus produced within pump 153 which is connected to the aforementioned source of hydraulic fluid. Hydraulic lines 154 and 155 connect pump 153 to the hydraulic side 156 of wobble plate 157 thereby to rotate shaft 158. Clutch 159 may be controlled in any suitable fashion, a manual control lever 160 being shown, and connects shaft 158 with gear reduction unit 120 to thereby actuate rammer chain 15 by way of sprocket wheel 14. Any suitable interlock, not shown, may be employed for preventing simultaneous operation of the rammer and shuttle car. The position of the rammer is manually controlled by either handwheel 137 or 138, as desired, each of which regulates hydraulic power drive 101 and, consequently, gear reduction unit 120. The rammer head 16 engages the lowermost shoe 17 on the missile and pushes the missile along and off of the shuttle car rails 97, 98, and 99, track section 109, and onto the registering spanner rail 18 and the launcher rails 36, 37, and 38. Prior to ramming, all movable structures which determine the ramming path are locked together by suitable hydraulic latches, not shown, so that they will not shift relative to one another.

Figure 17:
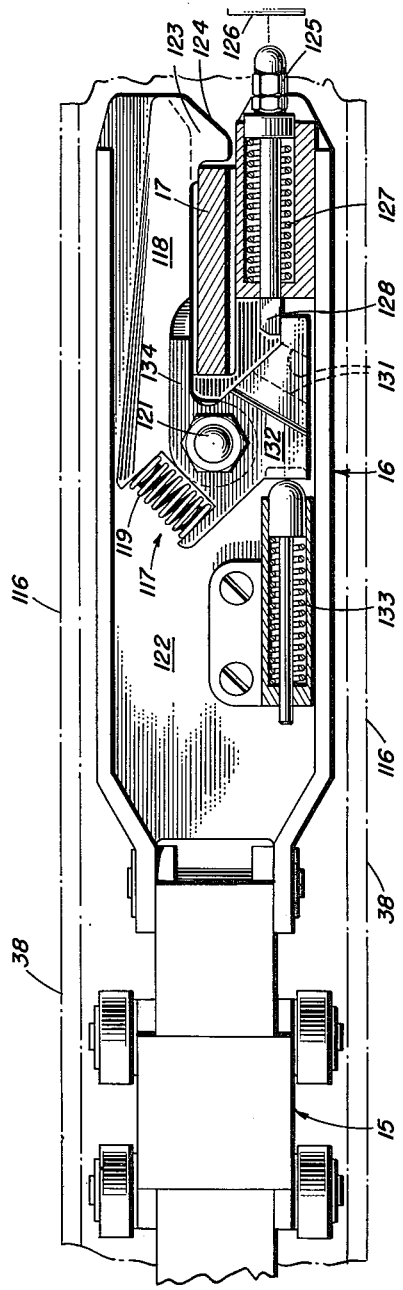
Fig. 17 is an enlarged top plan view of the rammer head assembly with portions shown in horizontal section.
Figure 18:
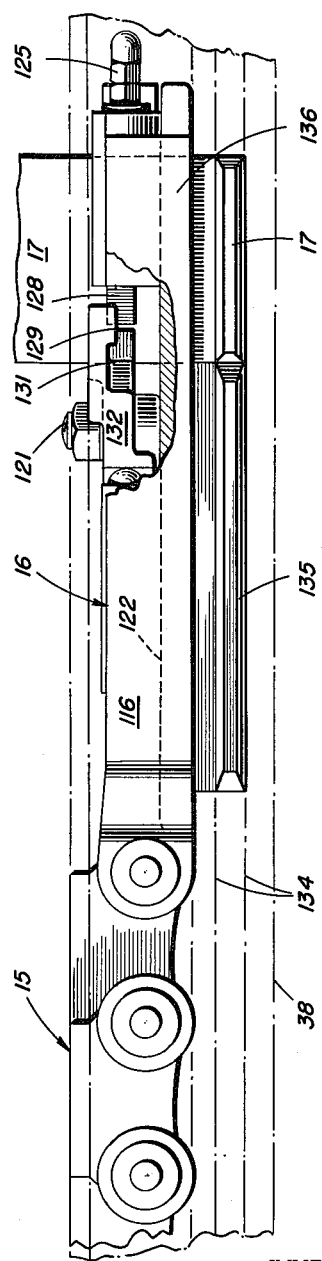
Fig. 18 is an enlarged side elevation of the rammer head assembly.

The rammer head assembly 16, Figs. 17 and 18, includes laterally spaced walls 116 within which the missile gripping and releasing mechanism 117 is partially enclosed. A deceleration and missile retraction latch 118 which is spring loaded by spring 119 is pivotally connected upon stud 121 which is secured in an erect position on the floor 122 of rammer head assembly 16. The deceleration and missile retraction latch 118 is provided with a hooked portion 123 for engagement behind the lower missile launching shoe 17 of a missile, the leading surface of hook portion 123 being inclined so as to provide a cam surface 124.

When shoe 17 is encountered by hook portion 123 in response to a forward motion of rammer chain 15, cam surface 124 will ride over the surface of shoe 17 to thereby laterally displace latch 118 against the action of spring 119. When the hook portion 123 has cleared shoe 17, spring 119 forces latch 118 into the position shown in Fig. 17, whereby the missile is secured to the rammer head assembly 16 for either loading onto the launcher or retraction therefrom, as the case may be.

The launching shoe 17 is released from the rammer head assembly when trigger 125 strikes stop 126 on the launcher during the loading operation whereupon the trigger is moved against the action of spring 127 in such a manner that the offset lug 128 thereon rides under projection 129 and into space or recess 131 of sear 132 which is resiliently loaded by spring 133. The sear 132 then swings on pivot 121 in response to the release of its spring load so that finger 134 thereon presses outwardly against the latch 118 thereby moving hook portion 123 to the unlatched position. Rammer head assembly 16 can then be returned to its initial position where it may be reset by hand.

It will be readily apparent that during a retraction operation as when it is desired to remove a missile from the launcher rather than to launch the missile, shoe 17 is secured to the rammer head assembly in the manner afore-described. The rammer head assembly together with the missile to which it is connected is next retracted to the loading mechanism 11. Trigger 125 is then manually actuated to release the shoe 17 whereupon the missile may be lifted from the loading mechanism by the overhead trolley crane, mentioned hereinbefore.

It will be noted that the lower rail sections on the loading mechanism 11, short track section 109, and spanner rail 18 are provided with a lower guideway 134 which is of a shape substantially corresponding to an inverted T. This T-shaped guideway accommodates a guide 135 which is mounted on the undersurface 136 of floor 122 of the rammer head assembly. Guide 135 is of a shape complementary to guideway 134 and is inserted into the guideway from the end thereof.

The movement of rammer chain may be controlled by either handwheel 137 or 138, as previously mentioned.

Assembly stand

The assembly stand 13 is a fixed structure positioned behind the loader and provided with a set of three rails 141, 142, and 143 on which missile components may be assembled, the electronic components checked out and the missile fueled and otherwise made ready for transfer to the loader. Each rail on the assembly stand is provided with a horizontally slidable rail section to thereby permit missile components to be placed on the assembly stand and retained against separation from the stand.

A control panel, not shown, may be located remotely from the launcher, loader, and rammer mechanisms and may include indicator lights which show the conditions in the system such, for example, as loaded, unloaded, latched, unlatched, on director signal, on loading signal, etc. The control panel may further include off-mount operating and selector controls, forming no part of the present invention.

Operation

The missiles are first assembled and given an operational check out on the assembly stand 13. One or two missiles, as desired, are then transferred to shuttle car 24 by the employment of the afore-mentioned overhead trolley (not shown). The sliding rail sections 105 on shuttle car 24 are moved so as to permit each missile to be placed upon the shuttle car from above. Slidable rails 105 are then repositioned so as to maintain the missile on the shuttle car. If desired, further check out of the missile may be performed while the missile is on the shuttle car. The shuttle car motor 101 is now set in operation and the missile to be loaded is aligned with rammer 12 by proper operation of shuttle car control lever 104.

The rammer mechanism 12 is now set in operation so as to move rammer head 16 slowly forward until the rear missile launching shoe 17 is connected to rammer head 16. The sliding doors 28 are next opened and the launcher 10 is positioned in train, elevation, and cross traverse to the loading position and locked as is best indicated in Fig. 1.

The missile is now rammed to the loaded position on launcher 10 whereupon the rammer head 16 automatically releases the missile launching shoe 17 at the end of the rammer stroke and rammer chain 15 is retracted. The electrical connector 70 and the air supply connector 71 are engaged with the missile to supply the necessary prefiring energy and information to the missile. If the missile is to be fired at a short range the holdback device 73 is adjusted by controls on the control panel (not shown) to secure the missile until a predetermined amount of residual energy remains in the missile.

Figure 2:
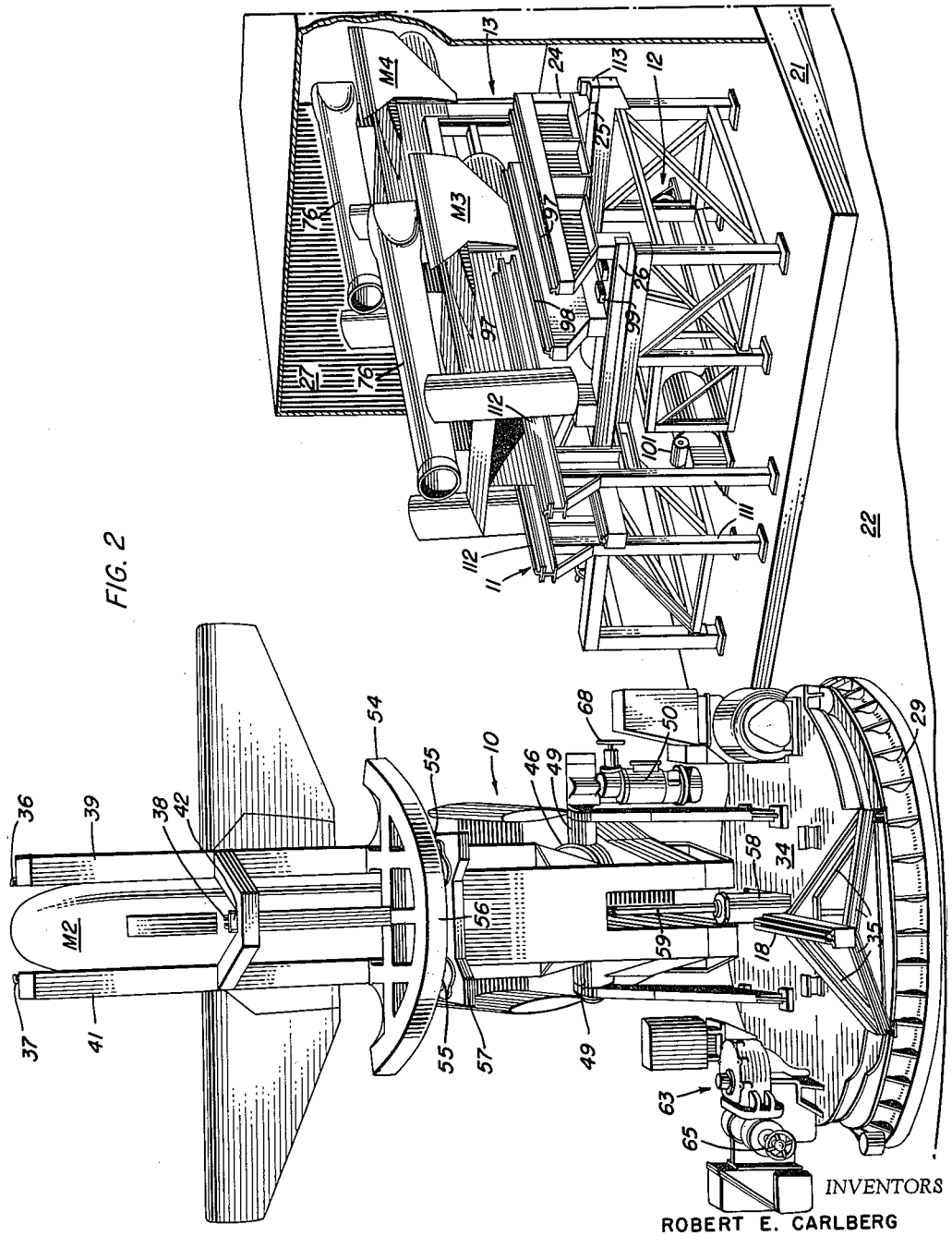
Figure 3:
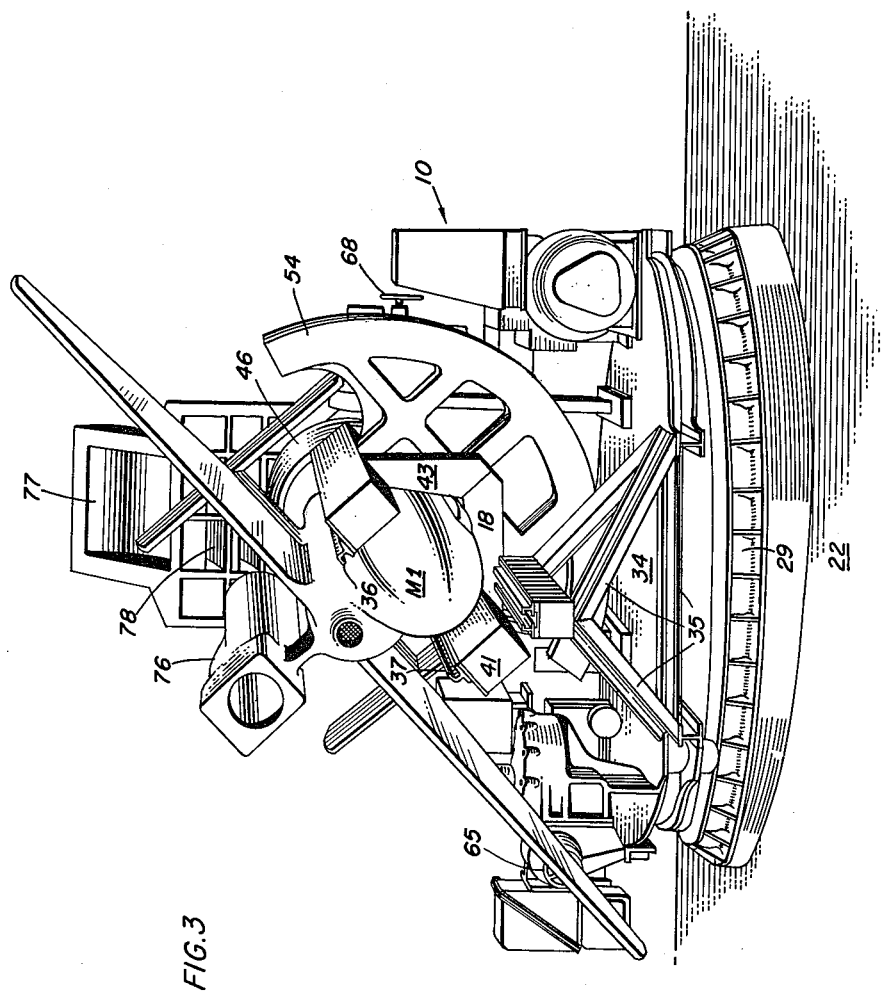
Fig. 3 is a front perspective view of the launcher with a missile loaded thereon and indicating the manner in which the launcher may be oscillated to a cross-traverse position.
Figure 4:
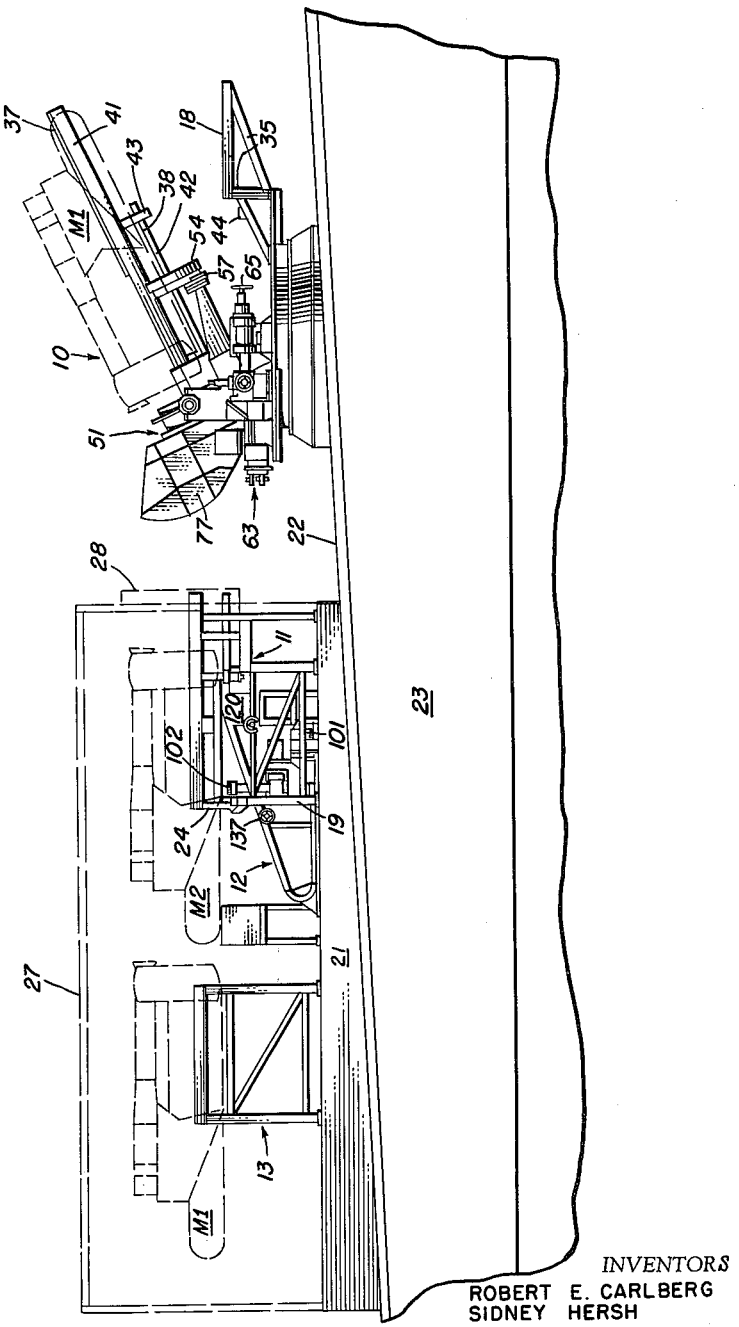
Fig. 4 is a side elevation view of the missile launching system of the present invention indicating the manner in which the system may be mounted upon the deck of a vessel.

Finally the hydraulically operated launcher latches, not shown, are released and the launcher brought into launching position as shown in Fig. 2 by operation of train, elevation, and cross-traverse power drives whereupon the missile is ready for launching.

Summary

Briefly summarizing it will be apparent that a novel missile launching system has been provided with launching rails stabilized along three axes to maintain the missile to be launched in a predetermined attitude with respect to the horizon. The launcher is loaded from the "muzzle" thereof by the use of a power driven, manually controlled horizontal rammer of the unidirectional chain type. The rammer is provided with a ramming head assembly which is so constructed as to enable the rammer to either move a missile forward under positive control or to retract a missile from the launcher as desired.

In addition, a loader is provided and carries a shuttle car which is power operated under manual control and mounted on tracks transverse to the longitudinal axis of the launcher when the latter is in loading position. The shuttle car is constructed so as to be capable of carrying a plurality of missiles, one of which will always be aligned longitudinally with the launcher loading position.

An assembly stand is also provided and is equipped with missile supporting rails so that the missile components may be assembled on the stand, checked out for satisfactory operating condition and moved by overhead trolley or any other suitable means to the shuttle car on the loader.

Obviously many modifications and variations of the present invention are possible in the light of the above teachings. It is therefore to be understood that within the scope of the appended claims the invention may be practiced otherwise than as specifically described.

What is claimed is:

1. A missile launching system carried by a vehicle and comprising, in combination, a three axis stabilized launcher mounted for movement from a loading position to a plurality of launching positions and vice versa, a plurality of loading and launching rails carried by said launcher; an enclosed loading mechanism including a shuttle car, shuttle car supporting rails disposed transversely to the longitudinal axis of the launcher when the latter is in the loading position, missile carrying rails mounted upon said shuttle car and parallel with said longitudinal axis and alignable with said loading and launching rails of said launcher when the launcher and shuttle car are in their respective loading positions, means for preventing vertical movement of missiles carried by the shuttle car while permitting longitudinal movement thereof; and a rammer operable to ram a missile from said shuttle car onto said launching rails of the launcher when the shuttle car and launcher are in their respective loading positions, said rammer including a rammer head, and means on said rammer head for positively coupling said rammer to the missile to be loaded for moving the missile from said shuttle car onto said launcher and vice versa.

2. A missile launching system comprising, in combination, a three axis stabilized launcher mounted for movement from a loading position to a plurality of launching positions and vice versa, a plurality of loading and launching rails carried by said launcher, means for oscillating the launching rails about the longitudinal axis of a missile carried thereby in response to roll; a loading mechanism including a shuttle car, a supporting structure, shuttle car supporting rails secured to said supporting structure transversely with respect to the longitudinal axis of the launcher when the latter is in loading position, a geared rack carried by said shuttle car, a pinion in driving engagement with said rack, a power drive drivingly connected to said pinion for effecting oscillatory movement of the shuttle car along said supporting rails in response to operation of said power drive, missile carrying rails mounted upon said shuttle car and in parallel relation to said longitudinal axis and longitudinally alignable with said loading and launching rails of said launcher when the launcher and shuttle car are in their respective loading positions, and rammer guide rails in individual longitudinal alignment with corresponding ones of said loading and launching rails of the launcher and with said predetermined ones of said missile carrying rails when said launcher and shuttle car are in loading position; and a ramming mechanism operable to ram a missile from said shuttle car onto said launching rails of the launcher when said shuttle car and launcher are in loading position, said ramming mechanism including a rammer head, a latch member pivotally carried by said rammer head, a sear pivotally secured to said rammer head in engagement with said latch member, spring loaded means for urging said sear and latch member laterally outward, a latch trigger in slidable engagement with said sear for maintaining the sear and latch in a first position against the action of said spring loading means, and cooperating means on said sear and trigger for releasing said sear in response to actuation of said trigger whereupon said spring loading means pivotally moves said sear and latch member to a second position to release a portion of a missile held by said latch member when the latter is in said first position.

3. A missile launching system comprising, in combination, a three axis stabilized launcher mounted for movement from a loading position to a plurality of elevation, train, and cross-traverse positions and vice versa, a plurality of missile loading and launching rails carried by said launcher; a loading mechanism including a shuttle car, shuttle car supporting means disposed transversely to the longitudinal axis of the launcher when the latter is in the loading position, missile carrying rails mounted upon said shuttle car and parallel with said longitudinal axis, selected ones of said missile carrying rails being longitudinally alignable with said loading and launching rails of said launcher when the launcher and shuttle car are in their respective loading positions to thereby provide a continuous track from the shuttle car to the launcher, a sliding rail section on each of said missile carrying rails for receiving a portion of each missile carried by the shuttle car and preventing vertical movement thereof while permitting longitudinal movement thereof, said shuttle car being carried upon said supporting means for oscillatory movement transverse to said longitudinal axis of the launcher, and means for effecting such movement of said shuttle car; and a ramming mechanism operable to ram a missile from said shuttle car onto said launching rails of the launcher when the shuttle car and launcher are in their respective loading positions, said ramming mechanism including a unidirectional chain, means drivingly connected to said chain, a rammer head connected to one end of said chain, and means on said rammer head for positively coupling said chain to the missile to be loaded for moving the missile from said shuttle car onto said launcher and vice versa, said rammer chain being mounted in longitudinal alignment with said longitudinal axis of said launcher.

4. A missile launching system comprising, in combination, a launcher stabilized in three dimensions and mounted for movement from a loading position to a plurality of launching positions and vice versa, a plurality of loading and launching rails carried by said launcher; a loading mechanism including a shuttle car, track means for said shuttle car and disposed transversely with respect to the longitudinal axis of the launcher when the latter is in loading position, a geared rack carried by said shuttle car, a pinion in driving engagement with said rack, a power drive drivingly connected to said pinion for effecting oscillatory movement of the shuttle car along said track means, missile carrying rails mounted upon said shuttle car and in parallel relation to said longitudinal axis and longitudinally alignable and registerable with said loading and launching rails of said launcher when the launcher and shuttle car are in their respective loading positions, said shuttle car being carried upon said track means for oscillatory movement transverse to said longitudinal axis of the launcher, and a plurality of stationary rammer guide rails disposed in individual longitudinal alignment with corresponding ones of said shuttle car rails and loading and launching rails of the launcher when the shuttle car and launcher are in loading position; a ramming mechanism for ramming a missile from said shuttle car onto said launching rails of the launcher via said rammer guide rails when said shuttle car and launcher are in loading position, said ramming mechanism including a rammer head, a latch member pivotally carried by said rammer head, a sear pivotally secured to said rammer head in engagement with said latch member, resilient means for urging said sear and latch member laterally outward, a latch trigger in slidable engagement with said sear for maintaining the sear and latch in a first position against the action of said resilient means, and cooperating means on said sear and trigger for releasing said sear in response to actuation of said trigger whereupon said resilient means pivotally moves said sear and latch member to a second position to release a portion of a missile held by said latch member when the latter is in said first position.

5. A missile launching system adapted to be carried by a ship and comprising, in combination, a launcher mounted for movement from a loading position to a plurality of launching positions and vice versa, loading and launching rails carried by said launcher; shuttle car supporting rails disposed transversely with respect to the longitudinal axis of the launcher when the latter is in loading position, a plurality of rollers carried by said shuttle car and cooperatively engaging said supporting rails for facilitating movement of the shuttle car along the supporting rails and for preventing undesired separation of the shuttle car therefrom, a geared rack carried by said shuttle car, means for effecting oscillatory movement of the shuttle car along said supporting rails, and a plurality of stationary rammer guide rails in individual longitudinal alignment with corresponding ones of said loading and launching rails of the launcher when the latter is in loading position; and a ramming mechanism operable to ram a missile from said shuttle car onto said launching rails of the launcher when said shuttle car and launcher are in loading position, said ramming mechanism including a rammer head, a latch member pivotally carried by said rammer head, a sear pivotally secured to said rammer head in engagement with said latch member, spring loaded means for urging said sear and latch member laterally outward, a latch trigger in slidable engagement with said sear for maintaining the sear and latch in a first position against the action of said spring loaded means, and cooperating means on said sear and trigger for releasing said sear in response to actuation of said trigger whereupon said spring loaded means pivotally moves said sear and latch member to a second position to release a portion of a missile held by said latch member when the latter is in said first position.

6. A missile launching system adapted for shipboard installation comprising, in combination, a three axis stabilized launcher mounted for movement from a loading position to a plurality of launching positions and vice versa, said launcher including a rotatable base ring structure, loading and launching rails carried by said launcher, an elevation trunnion and a cross-traverse trunnion respectively carried by said base ring structure and operatively connected to said launching rails, an elevating cylinder operatively connected between said base ring structure and said launching rails for elevating the latter in response to fluid pressure within said elevating cylinder, means for oscillating said launching rails in cross traverse, said launching rails being maintained at a fixed, predetermined launching attitude with respect to the horizon independent of roll, pitch and yaw of the ship, the fixed attitude of the launching rails being maintained by cooperative actuation of said base ring structure, said elevating cylinder, and said means for oscillating the launching rails; a loading mechanism including a shuttle car mounted for transverse motion relative to said launcher when the latter is in loading position, missile carrying rails mounted upon said shuttle car and longitudinally alignable with said loading and launching rails of the launcher when the launcher and the shuttle car are in their respective loading positions; and a ramming mechanism operable to a ram a missile from said shuttle car onto the launching rails of the launcher when the shuttle car and launcher are in the loading position.

7. A missile launching system comprising, in combination, a three axis stabilized launcher mounted for movement from a loading position to a plurality of launching positions and vice versa, a plurality of loading and launching rails carried by said launcher, a cross-traverse trunnion respectively carried by said base ring structure and operatively connected to said launching rails, a ring gear secured to said cross-traverse trunnion and a power driven worm gear connected in driving relation to said ring gear whereby said cross-traverse trunnion and said launching rails connected thereto are oscillated about the longitudinal axis of a missile carried thereby in response to rotation of said worm gear in alternate directions; an enclosed loading mechanism including a shuttle car, supporting rails disposed transversely to the longitudinal axis of the launcher when the latter is in the loading position, missile carrying rails mounted upon said shuttle car and parallel with said longitudinal axis predetermined ones of said missile carrying rails being longitudinally alignable with said loading and launching rails of said launcher when the launcher and shuttle car are in their respective loading positions, and means for effecting oscillatory movement of said shuttle car; and a ramming mechanism operable to ram a missile from said shuttle car onto said launching rails of the launcher when the shuttle car and launcher are in their respective loading positions, said ramming mechanism including a rammer head and means on said rammer head for positively coupling said ramming mechainsm to the missile to be loaded for moving the missile from said shuttle car onto said launcher and vice versa.

8. A missile launching system carried by a vehicle and comprising, in combination, a launcher mounted for movement from a loading position to a plurality of launching positions and vice versa, loading and launching rails carried by said launcher, means for moving said launching rails in elevation, train, and cross traverse to thereby maintain said launching rails at a fixed attitude with respect to the horizon independent of roll, pitch, and yaw of the vehicle when said rails have been moved to a launching position; a loading mechanism including a shuttle car mounted for transverse motion relative to said launcher when the latter is in loading position, missile carrying rails mounted upon said shuttle car and longitudinally alignable with said loading and launching rails of the launcher when the launcher and the shuttle car are in their respective loading positions; and a ramming mechanism operable to ram a missile from said shuttle car onto said launching rails of the launcher when the shuttle car and launcher are in their respective loading positions, said ramming mechanism including a unidirectional chain, means drivingly connected to one end of said chain, and means on said rammer head for positively coupling said chain to the missile to be loaded for moving the missile from said shuttle car onto said launcher and vice vesa, said rammer chain being mounted in alignment with said longitudinal axis of the launcher.

9. A missile launching system comprising in combination, a launcher mounted for movement from a loading position to a plurality of launching positions and vice versa, said launcher including a plurality of loading and launching rails carried by said launcher, a cross-traverse trunnion operatively connected to said launching rails, a ring gear secured to said cross-traverse trunnion and a worm gear connected in driving relation to said ring gear whereby said cross-traverse trunnion and said launching rails connected thereto are oscillated about the longitudinal axis of a missile carried thereby in response to oscillatory motion of said worm gear; a loading mechanism including a shuttle car mounted for transverse motion relative to said launcher when the latter is in loading position, missile carrying rails mounted upon said shuttle car and longitudinally alignable with said loading and launching rails of the launcher when the launcher and the shuttle car are in their respective loading positions; and a ramming mechanism operable to ram a missile from said shuttle car onto said launching rails of the launcher when said shuttle car and launcher are in loading position, said ramming mechanism including a rammer head, and means for positively coupling the rammer head to a missile and for positively uncoupling the rammer head from the missile after the latter has been rammed onto the launcher.

10. A missile launching system comprising, in combination, a three axis stabilized launcher mounted for movement from a loading position to a plurality of launching positions and vice versa, loading and launching rails carried by said launcher; a loading mechanism including a shuttle car, a supporting structure, supporting rails secured to said supporting structure transversely with respect to the longitudinal axis of the launcher when the latter is in loading position, a plurality of rollers carried by said shuttle car, said rollers cooperatively engaging said supporting rails for facilitating movement of the shuttle car along the supporting rails, a geared rack carried by said shuttle car, a power driven pinion in driving engagement with said rack for effecting oscillatory movement of the shuttle car transverse to said longitudinal axis and along said supporting rails in response to rotation of said pinion, missile carrying rails mounted upon said shuttle car and in parallel relation to said longitudinal axis, said missile carrying rails being longitudinally alignable with said loading and launching rails of said launcher when the launcher and shuttle car are in their respective loading positions, a sliding rail section on each of said missile carrying rails for receiving a portion of each missile carried by the shuttle car and preventing vertical displacement of the missile relative to the shuttle car while permitting longitudinal movement of the missile, and a plurality of stationary rammer guide rails rigidly secured to said supporting structure and in individual longitudinal alignment with corresponding ones of said loading and launching rails of the launcher when the latter is in loading position; and a ramming mechanism operable to ram a missile from said shuttle car onto the launching rails of the launcher when the shuttle car and launcher are in the loading position.

11. A missile launching system carried by a vehicle and comprising, in combination, a stabilized launcher mounted for movement from a loading position to a plurality of launching positions and vice versa, a plurality of loading and launching rails carried by said launcher, means for moving said launching rails in elevation, train, and cross traverse to thereby maintain said launching rails at a fixed attitude with respect to the horizon independent of roll, pitch, and yaw of the vehicle when said rails have been moved to a launching position; an enclosed loading mechanism including a shuttle car, a supporting structure, shuttle car supporting rails secured to said supporting structure transversely to the longitudinal axis of the launcher when the latter is in the loading position, missile carrying rails mounted upon said shuttle car and parallel with said longitudinal axis, predetermined ones of said missile carrying rails being simultaneously longitudinally alignable with said loading and launching rails of said launcher when the launcher and shuttle car are in their respective loading positions, means on said missile carrying rails for releasably retaining a portion of each missile carried by the shuttle car and preventing vertical movement thereof relative to the shuttle car while permitting longitudinal movement thereof, said shuttle car being carried upon said supporting rails for oscillatory movement transverse to said longitudinal axis of the launcher, and means for effecting such movement of said shuttle car; and a ramming mechanism operable to ram a missile from said shuttle car onto the launching rails of the launcher when the shuttle car and launcher are in the loading position.

12. A missile launching system comprising, in combination, a three axis stabilized launcher mounted for movement from a loading position to a plurality of launching positions and vice versa, and loading and launching rails carried by said launcher; a loading mechanism including a shuttle car mounted for transverse motion relative to said launcher when the latter is in loading position, missile carrying rails mounted upon said shuttle car and longitudinally alignable with said loading and launching rails of the launcher when the launcher and the shuttle car are in their respective loading positions; a ramming mechanism for moving a missile from said shuttle car onto said launching rails of the launcher when said shuttle car and launcher are in loading position, said ramming mechanism including a unidirectional chain mounted in longitudinal alignment with said longitudinal axis of the launcher, means drivingly connected to said chain, a rammer head connected to one end of said chain, a latch member pivotally carried by said rammer head, a sear pivotally secured to said rammer head in engagement with said latch member, spring loaded means for urging said sear and latch member laterally outward, a latch trigger in slidable engagement with said sear for maintaining the sear and latch in a latched position against the action of said spring loaded means, and cooperating means on said sear and trigger for releasing said sear in response to actuation of said trigger whereupon said spring loaded means pivotally moves said sear and latch member to an unlatched position to release a portion of a missile held by said latch member when the latter is in said latched position.

13. A missile launching system carried by a vehicle and comprising, in combination, a stabilized launcher mounted for movement from a loading position to a plurality of launching positions and vice versa, loading and launching rails carried by said launcher, means for moving said launching rails in elevation, train, and cross traverse to thereby maintain said launching rails at a fixed attitude with respect to the horizon independent of roll, pitch, and yaw of the vehicle when said rails have been moved to a launching position; an enclosed loading mechanism including a shuttle car, supporting rails disposed transversely to the longitudinal axis of the launcher when the latter is in the loading position, missile carrying rails mounted upon said shuttle car and parallel with said longitudinal axis, said missile carrying rails being longitudinally alignable with said loading and launching rails of said launcher when the launcher and shuttle car are in their respective loading positions, means for receiving a portion of each missile carried by the shuttle car and preventing vertical movement thereof relative to the shuttle car while permitting relative longitudinal movement therebetween, said shuttle car being carried upon said supporting rails for oscillatory movement transverse to said longitudinal axis of the launcher, and means for effecting such movement of said shuttle car; a ramming mechanism operable to ram a missile from said shuttle car onto said launching rails of the launcher when said shuttle car and launcher are in loading position, said ramming mechanism including a unidirectional chain mounted in longitudinal alignment with said longitudinal axis of the launcher, a power driven means drivingly connected to said chain, a rammer head connected to one end of said chain, a latch member movably carried by said rammer head, a sear movably secured to said rammer head in engagement with said latch member, spring loaded means for urging said sear and latch member laterally outward, a latch trigger in slidable engagement with said sear for maintaining the sear and latch in a latched position against the action of said spring loaded means, and cooperating means on said sear and trigger for releasing said sear in response to actuation of said trigger whereupon said spring loaded means moves said sear and latch member to an unlatched position to release a portion of a missile held by said latch member when the latter is in said latched position.

14. A missile launching system carried by a vehicle and comprising, in combination, a three axis stabilized launcher mounted for movement from a loading position to a plurality of launching positions and vice versa, a plurality of loading and launching rails carried by said launcher, means for moving said launching rails in elevation, train, and cross traverse to thereby maintain said launching rails at a fixed attitude with respect to the horizon independent of roll, pitch, and yaw of the vehicle when said rails have been moved to a launching position; an enclosed loading mechanism including a shuttle car, a shuttle car supporting structure, supporting rails secured to said supporting structure transversely to the longitudinal axis of the launcher when the latter is in the loading position, missile carrying rails mounted upon said shuttle car and parallel with said longitudinal axis, said missile carrying rails being longitudinally alignable with said loading and launching rails of said launcher when the launcher and shuttle car are in their respective loading positions, means for receiving a portion of each missile carried by the shuttle car and preventing vertical displacement of the missile relative to the shuttle car while permitting longitudinal movement of the missile upon the shuttle car, said shuttle car being carried upon said supporting rails for oscillatory movement transverse to said longitudinal axis of the launcher, and means for effecting such movement of said shuttle car; and a ramming mechanism operable to ram a missile from said shuttle car onto said launching rails of the launcher when the shuttle car and launcher are in their respective loading positions, said ramming mechanism including a unidirectional chain, means for driving said chain, a rammer head connected to one end of said chain, and means on said rammer head for positively coupling said chain to the missile to be loaded for moving the missile from said shuttle car onto said launcher and vice versa, said rammer chain being mounted in longitudinal alignment with said longitudinal axis of said launcher.

References Cited in the file of this patent
UNITED STATES PATENTS

| | | |
|---|---|---|
| 640,051 | Tower | Dec. 26, 1899 |
| 811,797 | Schneider | Feb. 6, 1906 |
| 895,481 | Meigs et al. | Aug. 11, 1908 |
| 1,474,745 | Walker et al. | Nov. 22, 1919 |
| 1,497,763 | Muller | Sept. 2, 1921 |
| 2,069,417 | Murtagh et al. | Feb. 2, 1937 |
| 2,425,425 | Jorgensen | Aug. 12, 1947 |
| 2,426,610 | Hopkins | Sept. 2, 1947 |

(Other references on following page)

UNITED STATES PATENTS

| | | |
|---|---|---|
| 2,440,634 | Henney | Apr. 27, 1948 |
| 2,485,715 | Eastman | Oct. 25, 1949 |
| 2,501,479 | Sproule | Mar. 21, 1950 |
| 2,520,966 | Schiff | Sept. 5, 1950 |
| 2,585,030 | Nosker | Feb. 12, 1952 |
| 2,604,698 | Ewing | July 29, 1952 |
| 2,660,928 | Marlow | Dec. 1, 1953 |
| 2,745,317 | Stanton et al. | May 15, 1956 |
| 2,814,453 | Trimble et al. | Nov. 26, 1957 |
| 2,826,960 | Schiavi | Mar. 18, 1958 |

FOREIGN PATENTS

| | | |
|---|---|---|
| 25,326 | Great Britain | of 1894 |
| 171,502 | Germany | June 5, 1906 |
| 411,576 | Italy | Jan. 18, 1945 |